Sept. 30, 1958 D. W. NORWOOD 2,854,193

ILLUMINATION-QUALITY INDICATOR

Filed May 31, 1955 2 Sheets-Sheet 1

INVENTOR.
DONALD W. NORWOOD
BY
Christie, Parker & Hale
ATTORNEYS

Sept. 30, 1958 D. W. NORWOOD 2,854,193

ILLUMINATION-QUALITY INDICATOR

Filed May 31, 1955 2 Sheets-Sheet 2

INVENTOR.
DONALD W. NORWOOD

BY Christie, Parker & Hale

ATTORNEYS

United States Patent Office 2,854,193
Patented Sept. 30, 1958

2,854,193

ILLUMINATION-QUALITY INDICATOR

Donald W. Norwood, Pasadena, Calif.

Application May 31, 1955, Serial No. 512,219

7 Claims. (Cl. 235—64.7)

This invention relates to devices for providing an indication of the illumination quality of light on an object which is to be reproduced in the form of a picture.

In the fields of photography and television the appearance of a subject is of primary importance. This appearance is usually affected to a considerable extent by the intensity and the directional arrangement of each of the various elements of illumination acting on the subject. It is generally considered good practice to have one dominant element of illumination. This is known as the key-light. There is usually at least one element of secondary illumination. This is known as the fill-light. The sources of the key-light and the fill-light are spacially separated with respect to each other and to the subject, so that the key-light illuminates some surfaces of the camera-side of the three-dimensional subject, and the fill-light illuminates other surfaces of the camera-side of the subject.

The quality of a picture of either the photographic or electronic type depends to a considerable extent on the relationship of the intensities of the key-light and the fill-light. A comparison of these two values establishes a ratio. This ratio is sometimes called illumination-contrast or illumination-contrast-ratio. In practice the operator may encounter a ratio which is too low. In such a case the modeling effect, which enhances the illusion of a three-dimensional subject on a two-dimensional picture surface, is diminished or lost. On the other hand, at times the ratio may be too high. In this case difficulty is encountered with the limitations of the recording medium. The end result in this case is a decrease or total loss of tone values in either the fill-light illuminated areas or in the key-light illuminated areas of the subject, or in both.

Each recording medium, such as (1) Black-and-white film pictures
  (a) Transparency prints
  (b) Paper prints
(2) Color film pictures
  (a) Transparency prints
  (b) Paper prints
(3) Black-and-white television pictures
(4) Color television pictures operates to best advantage under conditions of an illumination-contrast-ratio which is peculiarly suited to that medium. In each case the acceptable ratio is not limited to one value but rather extends over a band of values. On each side of the optimum value band there is a gradual or rapid decrease in acceptability.

The total range of ratio values that should be considered extends from a ratio of 1/1 up to a ratio of 16/1.

Although some recording mediums offer some small degree of flexibility in adaption to variations in illumination-contrast, others present practically none. This is particularly true in the case of films which are machine developed by the time-and-temperature method. In all cases however, the best picture quality results are achieved if the illumination-contrast is adjusted to meet the requirements of the recording medium, rather than trying to proceed by a converse method.

It is difficult for the operator of a camera to arrange the illumination of an object so as to obtain a picture of the best possible quality. This is particularly true if a series of pictures is to be taken, with all of the pictures to be of substantially the same quality. Also, amateur camera operators find it difficult to select proper illumination to provide pictures of uniform high quality. This difficulty is increased if the camera operator uses more than one type film, such as black-and-white film and color film, because the optimum illumination contrast relationship is different for films of different types.

These difficulties are overcome in the present invention by the use of a device which provides an indication of the illumination quality for various light intensities with respect to the characterstics of a given recording medium. The device is provided with a scale representing key-light intensities and another scale representing fill-light intensities. One of the scales is movable with respect to the other, and one of the scales carries a numerical indicator for showing the illumination-contrast-ratio. One of the scales also carries a graphical indicator for showing the picture quality obtainable with at least one type of recording medium for the various settings of the two scales with respect to one another.

This device makes quality control of pictures easy to achieve by both professional and amateur camera operators. The essential information is presented both in numerical and in graphical form, so that the device provides a precise indication of the illumination-contrast-ratio, and it also provides an indication of the picture quality obtainable with any particular illumination-contrast-ratio. The numerical indication of the illumination-contrast-rato may be employed in selecting proper illumination for any type of recording medium. The graphical indication of picture quality is limited to a particular type of recording medium, but a plurality of graphical indicators may be employed so as to cover several different types of recording mediums.

The invention is explained in detail with reference to the drawings, in which.

Figure 1:
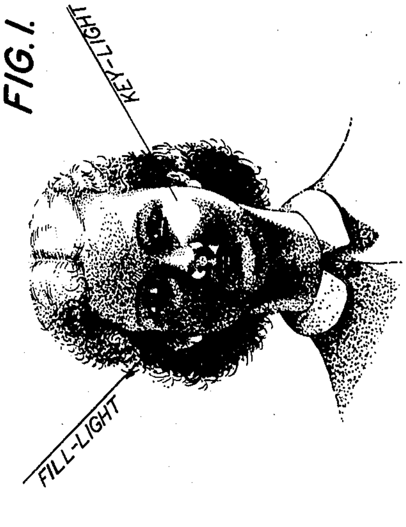
Fig. 1 illustrates the illumination of a subject by key-light and fill-light.

Fig. 1 illustrates a subject which is illuminated by key-light which is produced by a source which is disposed about 105° with respect to the axis along which the subject is observed. The other side of the subject is illuminated by fill-light which should have a certain intensity with respect to that of the key-light in order to obtain a picture of the best possible quality with a particular type recording medium.

For ordinary recording mediums, the illumination-contrast-ratios which should be considered extend from 1/1 to 16/1. Somewhere within this range will be found the band of optimum contrast ratios for the recording medium which is to be employed.

Figure 2:
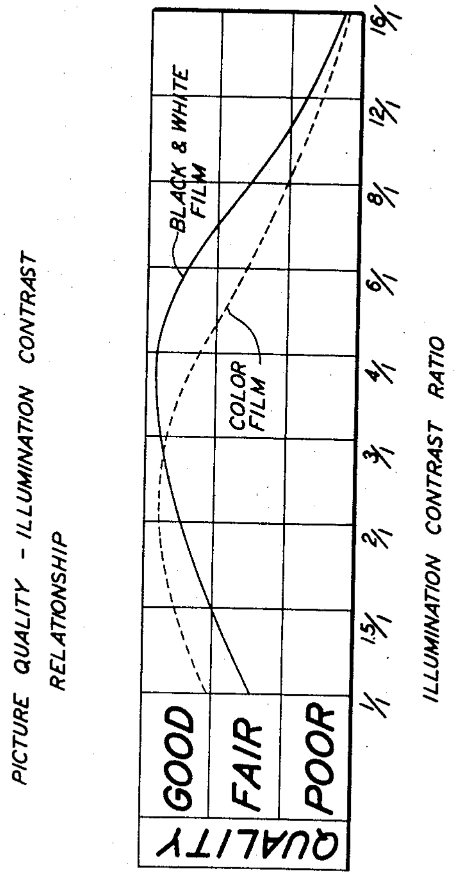
Fig. 2 is a chart showing the picture quality obtainable with respect to the illumination-contrast-ratio for two types of recording mediums.

The picture quality with respect to illumination-contrast-ratio which is obtainable with a certain recording medium may be indicated in graph form. Fig. 2 is a chart having rectangular coordinates which indicates the picture quality obtainable on transparency prints from a conventional black-and-white and from a conventional color film for illumination-contrast-ratios between 1/1 and 16/1. In the case of each recording medium, it will be found that the curve starts at a quality level somewhat below maximum for an illumination-contrast-ratio of 1/1, that the curve rises to a maximum value band as the illumination-contrast-ratio increases, and then the curve decreases to a low value as the illumination-contrast-ratio approaches 16/1. The picture quality axis may be divided into levels designating the type of picture obtainable. These levels are designated Good, Fair, and Poor on the chart of Fig. 2.

In order to use the quality control device of the present invention, the intensity of the effective key-light and the intensity of the effective fill-light should be ascertained. This may be accomplished by using a suitable light meter.

Figure 3:
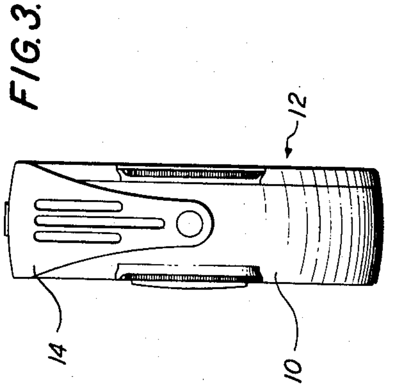
Fig. 3 illustrates how the device of the present invention may be mounted on the back of a light meter.

Preferably, the quality control device of the present invention is mounted on the light meter which is employed to measure the key-light and fill-light intensities. Fig. 3 illustrates such an arrangement wherein a light meter 10 has the quality control device 12 mounted on the back side of the light meter. The light meter is provided with a movable hood 14 for changing the range of the light meter.

The quality control device is supported on a backing member 16 having an inner face 18 which abuts against the back of the light meter. Four openings 19 are provided in the backing member for accommodating screws for joining the quality control device to the light meter. The backing member has a shape which mates with the contour of the light meter so that it appears to be an integral part of the housing for the light meter.

The backing member is provided with a cylindrical-shaped protrusion 20 which is centrally located on the backing member. A recessed area extends around the protrusion. A disk-shaped member 22 serves as the rotatable member of the device. The rotatable member is provided with a centrally-located portion 24 of cylindrical shape which is offset outwardly from the remaining peripheral portion 26 of the member. The offset portion 24 has inner surfaces which mate with the protrusion 20 on the backing member to permit rotation of the disk-shaped member about the protrusion on the backing member. The outer periphery of the rotatable member is provided with a knurled edge 27 so that the member may be rotated with ease by the operator. A portion of the backing member is cut away at each side so as to provide access to the knurled edge of the rotatable member.

A friction element 28 is located in a recess in the backing member, and it rubs against the back of the rotatable member to provide sufficient friction to prevent movement of the rotatable member except when the operator rotates it with his thumb or finger. The friction element may be a felt pad or a strip of spring metal bent to a desired shape.

A stop pin 30 is affixed to the backing, and it extends through an arcuate slot 32 in the rotatable member. The stop pin 30 and the slot 32 serve to limit the rotation of the rotatable disk to suitable limits, say to an arc of about 90°.

A face plate 34 is secured to the backing member by a plurality of screws 36. The face plate secures the rotatable member between the face plate and the backing member.

A key-light scale 38 is located on the rotatable member, and a fill-light scale 40 is located on the face plate. These two scales have delineations representing light intensities, say intensities from 1 to 128 foot-candles or multiples of these values, for the key-light scale and intensities from .30 to 128 foot-candles or multiples of these values for the fill-light scale. Preferably these two scales are exponential types.

A numerical scale 42 is located along a portion of the outer periphery of the rotatable member, and this scale serves to provide numerators for the indicator fraction which designates the illumination-contrast-ratio. Such an arrangement indicates the ratio of the intensity of the key-light to the intensity of the fill-light. It will be apparent that the ratio of the fill-light intensity to that of the key-light could be displayed if desired.

A pair of indicator lines or graphs 44 and 46 are provided on another portion of the outer periphery of the rotatable member. These two graphs represent the picture quality obtainable with respect to the illumination-contrast-ratio for two types of recording mediums, say for color film and for black-and-white film. The graphs 44 and 46 correspond to the curves for color film and for black-and-white film which are illustrated in Fig. 2. The graphs 44 and 46 are derived by translating the rectangular coordinate curves of Fig. 2 to polar coordinates so that they may be employed on the rotatable member of the quality control device.

A pair of apertures 48 and 50 are provided in the face plate for exposing portions of each of the graphs. A pair of quality scales 52 and 54 are located on the face plate adjacent the apertures for providing designations of picture quality along the graphs for the various settings of the key-light scale. In the arrangement shown in Fig. 4 these scales are provided with the designations Good, Fair, and Poor, so that the operator can tell at a glance the quality of the picture obtainable for the light intensities in question.

It will be apparent that the graphical information which is provided by the indicator lines 44 and 46 may be provided in other manners. By way of example, the information may be represented by colored areas rather than by discrete lines.

Figure 4:
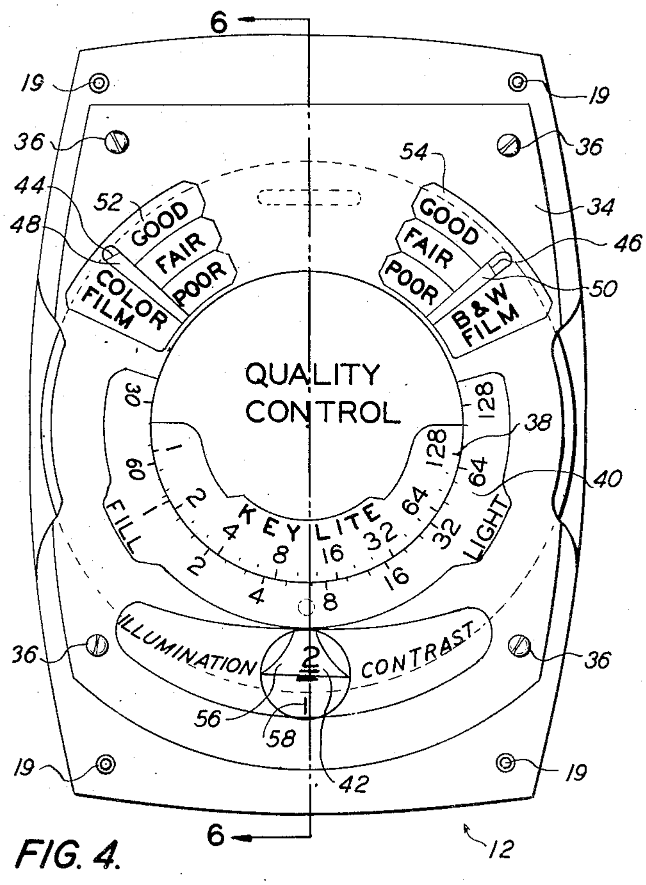
Fig. 4 is an enlarged plan view of the quality control device of the present invention.
Figures 5, 6:
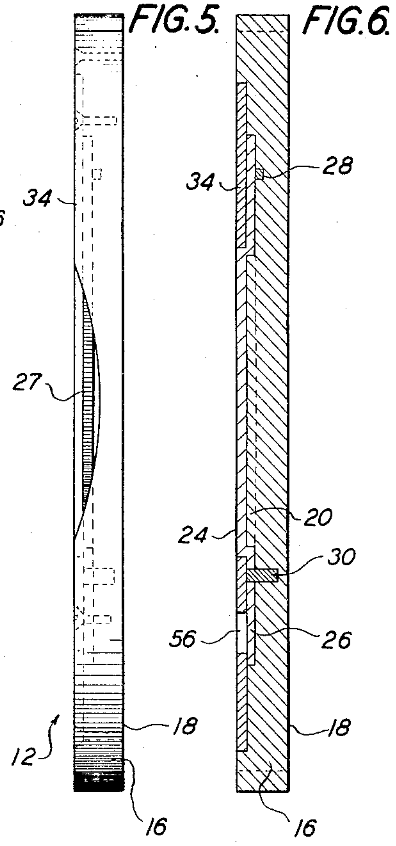
Fig. 5 is a side view of the device of Fig. 4.
Fig. 6 is a sectional view along line 6—6 of Fig. 4.
Figure 7:
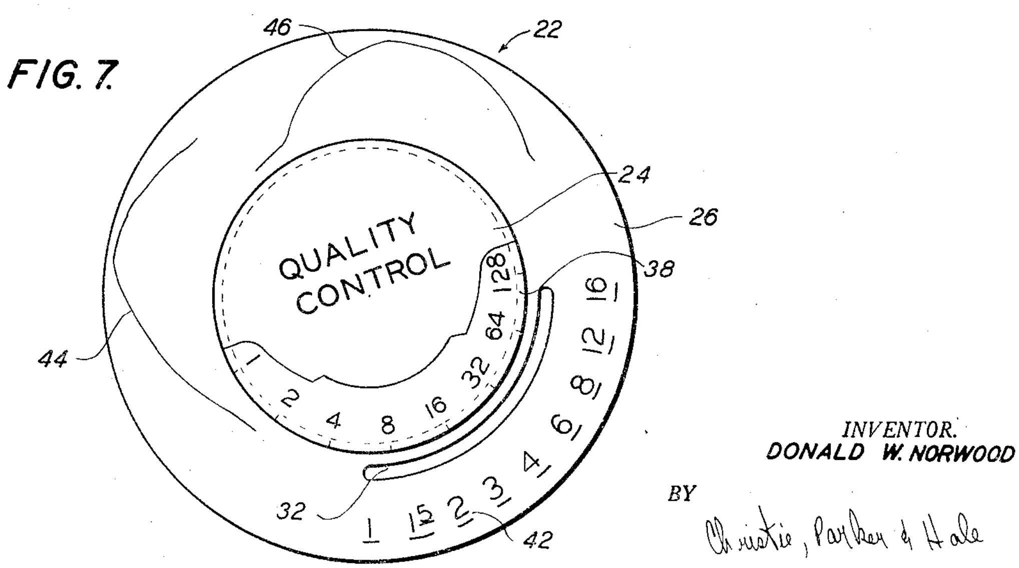
Fig. 7 is a plan view of the rotatable member of Fig. 4.

The face plate is also provided with an aperture 56 which serves to expose at least one of the numbers on the illumination-contrast scale 42. The face plate is provided with the denominator 58 for the illumination-contrast-ratio. As shown in Fig. 4, the denominator is the numeral "1" and it is located directly below the aperture 56 through which the numerators may be observed.

Preferably, the backing member 18 is composed of a plastic so that it may be fabricated with ease. However, it may be composed of other materials if desired. The rotatable member 22 and the face plate 34 may be made of sheet metal or sheet plastic. The scales and graphs may be engraved directly in the material and then filled with a suitable paint, or they may be printed on the various members or applied to them by means of decalcomanias.

The rotatable disk 22 may be turned so that any selected value on the key-light scale may be brought adjacent to any selected value on the fill-light scale, within significant limits. For each setting of the key-light scale, the illumination-contrast-ratio will be displayed at the aperture 56. For each illumination-contrast-ratio, there will be a related designation of picture quality obtainable with color film or with black-and-white film, and these designations may be observed at the apertures 48 and 50.

As an example, assume a value of 64 for the intensity of the key-light and a value of 8 for the intensity of the fill-light. The rotatable member is turned until 64 on the key-light scale is adjacent 8 on the fill-light scale. The numerical value of the illumination-contrast-ratio will be 8/1, and this can be observed at the aperture 56. The quality of the picture obtainable will be in the Fair-to-Poor region on the scale 52 for color film and in the Medium-Fair region on the scale 54 for black-and-white film.

In operation, the camera man first makes a measurement of the intensity of the effective key-light and the intensity of the effective fill-light. This may be accomplished by the use of a foot-candle meter having suitable acceptance angle, say a solid angle of about $2\pi$ steradians. The foot-candle meter is ordinarily used at the position of the subject. The operator then turns the rotatable member 22 with his thumb until the measured key-light intensity is located opposite the fill-light intensity which he has measured.

The operator then observes through the aperture 48 or through the aperture 50, depending upon the type of film which he is using, the position of the indicator line or graph with respect to the associated quality scale. In this maner he can tell at a glance the quality of picture which can be obtained with the particular illumination conditions then existing.

Thus, the indicator device evaluates the quality of the illumination with respect to a given recording medium in addition to predicting the quality of the picture which will result. For a given recording medium the illumination quality and the resulting picture quality are substantially parallel. The graphical indicator on the device evaluates both of these factors.

The operator may also observe the illumination-contrast-ratio at a glance. The illumination-contrast-ratio is primarily useful when the operator is employing a recording medium other than that for which the graphical indicators are designed.

An alternative way for using the quality control device is to first adjust the rotatable disk 22 until the desired illumination-contrast-ratio is shown at the aperture 56, or until the quality indicator shows the desired quality value on one of the quality scales. The camera man then measures the intensity of the key-light. Then he notes the location of the key-light intensity value on the key-light scale, and the intensity of the fill-light required to produce the desired illumination can be read from the fill-light scale at this location. The camera operator then adjusts the fill-light intensity until the indicated value is obtained.

Although the device of the present invention has been described with reference to providing designations of picture quality for color film and for black-and-white film, it will be apparent that the device may be arranged to designate picture quality for substantially any type of recording medium. Graphs for other types of recording mediums may be prepared by first providing charts in the form of rectangular coordinates, as illustrated in Fig. 2, and then converting the rectangular coordinates to polar coordinates so as to provide graphs which may be employed on the rotatable member of the device.

Although the quality control device may be affixed to a light meter, it will be apparent that the device is equally useful as a separate unit, and it is not necessary to attach it to a light meter.

I claim:

1. An illumination-quality indicator device comprising a key-light scale having delineations on it indicating a series of light intensities, a fill-light scale located adjacent the key-light scale and having delineations on it indicating a series of light intensities, means for providing relative movement between the two scales, the spacing of said light intensities being the same on both of said scales and being exponential so that for each relative setting of the scales the key light intensities are in a predetermined ratio to the fill-light intensities with that ratio being uniform along the length of the scales, means for providing a numerical indication of the ratio of the intensities of the key-light and the fill-light for various settings of the two scales with respect to one another, and graphical indicator means responsive to relative movement between the two scales for providing an indication of the picture quality obtainable for a plurality of recording mediums at various settings of the two scales with respect to one another.

2. An illumination-quality indicator device for mounting on the back of a light meter comprising a backing member having a shape which mates with the shape of the light meter on which it is to be mounted, the backing member having a recessed area centrally located on its outer face, a rotatable disk-shaped member having inner surfaces which mate with the recessed area of the backing member to permit rotation of the disk-shaped member on the backing member, delineations located along an inner portion of the rotatable member providing a first circular scale representing light intensities, a numerical scale located along another portion of the rotatable member for providing a numerical representation of illumination contrast, at least one graphical means located along an outer portion of the rotatable member representing the picture quality with respect to the illumination-contrast-ratio obtainable with at least one type of recording medium, a face plate having a circular aperture in it which mates with the portion of the rotatable member on which the first circular scale is located, delineations located on the face plate adjacent the circular aperture providing a second circular scale representing light intensities, and scale means located on the face plate and disposed adjacent the graphical means on the rotatable member providing designations of picture quality along the graphical means for the various settings of the first scale with respect to the second scale, one of said first and second circular scales representing a series of key-light intensities and the other representing a series of fill-light intensities, the spacing of said light intensities being the same on both of said first and second scales and being exponential so that for each relative setting of the scales the key-light intensities are in a predetermined ratio to the fill-light intensities with that ratio being uniform along the length of the scales.

3. An illumination-quality indicator device for mounting on the back of a light meter comprising a backing member having an inner face of a shape which mates with the shape of the light meter on which it is to be mounted, the backing member having a cylindrical-shaped protrusion centrally located on its outer face, a rotatable disk-shaped member having a centrally-located portion of cylindrical shape which is offset from the remainder of the member, with the offset portion having inner surfaces which mate with the protrusion on the backing member to permit rotation of the disk-shaped member around the protrusion on the backing member, delineations located along the periphery of the offset portion of the rotatable member providing an exponential scale representing key-light intensities, a numerical scale located along a portion of the outer periphery of the rotatable member for providing a numerical representation of illumination contrast, a pair of graphs located along another portion of the outer periphery of the rotatable member representing the picture quality obtainable with respect to the illumination-contrast-ratio for two types of recording mediums, a face plate having a circular aperture in it which mates with the outer periphery of the offset portion of the rotatable member, delineations located on the face plate adjacent the circular aperture providing an exponential scale representing fill-light intensities, the face plate having an aperture in it for exposing a portion of the numerical scale representing illumination contrast, the face plate also having a pair of apertures in it for exposing portions of each of the graphs, scale means located adjacent the pair of apertures providing designations of picture quality along the graphs for the various settings of the scales representing light intensities, and means for securing the face plate to the backing member with the face plate securing the rotatable member between the face plate and the backing member, said two exponential scales representing key-light and fill-light intensities having the light intensities thereon spaced the same on one scale as on the other so that for each relative setting of these scales the key-light intensities are in a predetermined ratio to the fill-light intensities with that ratio being uniform along the length of the scales.

4. An illumination-quality indicator comprising a first member having a first scale formed thereon defining a series of key-light intensities, a second member having a second scale formed thereon adjacent said key-light scale and defining a series of fill-light intensities, means connecting said members together for relative adjusting movement to vary the setting of one scale relative to the other, the spacing of said light intensities being the same on both of said scales and being exponential so that for each relative setting of the scales the key-light intensities are in a predetermined ratio to the fill-light intensities with that ratio being uniform along the length of the scales, and means on said two members relatively movable with the members and acting to indicate the illumination quality for various relative settings of the key-light and fill-light scales.

5. An illumination-quality indicator as recited in claim 4 in which said last mentioned means comprise markings on said members in addition to said scales forming a numerical indication of the illumination contrast ratio.

6. An illumination-quality indicator as recited in claim 4 in which said last mentioned means comprise a graphical indicator for indicating the picture quality obtainable for at least one type of recording medium.

7. An illumination-quality indicator comprising a first circular scale having delineations on it indicating a series of key-light intensities, a second circular scale located adjacent and disposed concentrically with respect to the first scale and having delineations on it indicating a series of fill-light intensities, means for rotating one of the scales with respect to the other, the spacing of said light intensities being the same on both of said scales and being exponential so that for each relative setting of the scales the key-light intensities are in a predetermined ratio to the fill-light intensities with that ratio being uniform along the length of the scales, a graph affixed to the first scale and providing a representation in polar coordinates of the picture quality with respect to the illumination-contrast-ratio which is obtainable with a recording medium of a predetermined type, and a third scale affixed to the second scale for providing designations of picture quality along the graph for various settings of the two first mentioned scales with respect to one another.

References Cited in the file of this patent

UNITED STATES PATENTS

| | | |
|---|---|---|
| 1,429,463 | Squyer | Sept. 19, 1922 |
| 2,152,604 | Perry | Mar. 28, 1939 |

FOREIGN PATENTS

| | | |
|---|---|---|
| 753,426 | France | Aug. 7, 1933 |